United States Patent
Iguchi et al.

(10) Patent No.: US 9,505,986 B2
(45) Date of Patent: Nov. 29, 2016

(54) FUEL OIL BASE AND AVIATION FUEL COMPOSITION CONTAINING SAME

(71) Applicant: JX NIPPON OIL & ENERGY CORPORATION, Tokyo (JP)

(72) Inventors: Yasutoshi Iguchi, Tokyo (JP); Hideki Ono, Tokyo (JP); Akira Koyama, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 28 days.

(21) Appl. No.: 14/331,775

(22) Filed: Jul. 15, 2014

(65) Prior Publication Data

US 2014/0323777 A1 Oct. 30, 2014

Related U.S. Application Data

(62) Division of application No. 13/391,765, filed as application No. PCT/JP2010/064723 on Aug. 30, 2010, now abandoned.

(30) Foreign Application Priority Data

Aug. 31, 2009 (JP) ................................. 2009-200777

(51) Int. Cl.
| | |
|---|---|
| C10L 1/00 | (2006.01) |
| C10G 3/00 | (2006.01) |
| C10G 45/58 | (2006.01) |
| C10G 65/04 | (2006.01) |
| C10L 1/04 | (2006.01) |

(52) U.S. Cl.
CPC . *C10G 3/50* (2013.01); *C10G 3/46* (2013.01); *C10G 3/49* (2013.01); *C10G 45/58* (2013.01); *C10G 65/043* (2013.01); *C10L 1/04* (2013.01); *C10G 2300/1014* (2013.01); *C10G 2300/1018* (2013.01); *C10G 2300/202* (2013.01); *C10G 2300/30* (2013.01); *C10G 2300/301* (2013.01); *C10G 2300/4018* (2013.01); *C10G 2300/80* (2013.01); *C10G 2400/08* (2013.01); *C10L 2200/043* (2013.01); *C10L 2200/0461* (2013.01); *C10L 2270/04* (2013.01); *C10L 2290/10* (2013.01); *Y02P 30/10* (2015.11); *Y02P 30/20* (2015.11)

(58) Field of Classification Search
USPC .................. 585/14, 240, 253, 273, 734–751
See application file for complete search history.

(56) References Cited

U.S. PATENT DOCUMENTS

| | | | |
|---|---|---|---|
| 4,300,009 A | 11/1981 | Haag et al. | |
| 4,992,605 A | 2/1991 | Craig et al. | |
| 5,766,274 A | 6/1998 | Wittenbrink et al. | |
| 6,669,743 B2 | 12/2003 | Wittenbrink et al. | |
| 6,743,962 B2 | 6/2004 | O'Rear et al. | |
| 7,217,852 B1 | 5/2007 | DeHaan et al. | |
| 7,232,935 B2 | 6/2007 | Jakkula et al. | |
| 7,320,748 B2 | 1/2008 | Hemighaus et al. | |
| 7,846,323 B2 | 12/2010 | Abhari et al. | |
| 7,919,664 B2 | 4/2011 | Hommeltoft et al. | |
| 7,928,273 B2 | 4/2011 | Bradin | |
| 7,955,495 B2 | 6/2011 | Hommeltoft et al. | |
| 7,968,757 B2 | 6/2011 | Abhari et al. | |
| 8,034,131 B2 | 10/2011 | Sutkowski et al. | |
| 8,039,682 B2 | 10/2011 | McCall et al. | |
| 8,124,823 B2 | 2/2012 | Hommeltoft et al. | |
| 8,143,469 B2 | 3/2012 | Koivusalmi et al. | |
| 8,686,203 B2 * | 4/2014 | Hanks .................... | C10G 49/00 44/605 |
| 8,766,025 B2 * | 7/2014 | Luebke ................. | C10G 45/04 585/265 |
| 8,889,932 B2 * | 11/2014 | Luetkens, Jr. ....... | C10G 65/043 208/49 |
| 9,040,766 B2 * | 5/2015 | Kettunen ............... | B01J 29/005 585/275 |
| 2002/0005009 A1 | 1/2002 | Wittenbrink et al. | |
| 2008/0092436 A1 | 4/2008 | Seames et al. | |
| 2008/0244962 A1 | 10/2008 | Abhari et al. | |
| 2009/0082603 A1 | 3/2009 | Kalnes et al. | |
| 2009/0158637 A1 | 6/2009 | McCall et al. | |
| 2010/0043279 A1 | 2/2010 | Abhari et al. | |
| 2011/0071327 A1 | 3/2011 | Abhari et al. | |
| 2011/0147268 A1 | 6/2011 | Hommeltoft et al. | |
| 2011/0196179 A1 | 8/2011 | Bradin | |
| 2011/0308142 A1 | 12/2011 | Abhari et al. | |
| 2012/0198757 A1 | 8/2012 | Koyama | |

(Continued)

FOREIGN PATENT DOCUMENTS

| | | |
|---|---|---|
| CN | 101466816 | 6/2009 |
| EP | 1 396 531 | 3/2004 |

(Continued)

OTHER PUBLICATIONS

U.S. Appl. No. 13/391,727 to Kazuaki Hayasaka et al., filed Feb. 22, 2012.
U.S. Appl. No. 13/391,891 to Akira Koyama, filed Feb. 23, 2012.
"The Path to a Jet Fuel Alternative:Airbus Initiatives and the Steps Ahead", ICAO Journal, Aug. 2009, pp. 22, 24.
Zhao et al., "Synthesis of ZSM-48 zeolites and their catalytic performance in C4-olefin cracking reactions", Applied Catalysis A: General 299, 2006, pp. 167-174.

(Continued)

*Primary Examiner* — Ellen McAvoy
(74) *Attorney, Agent, or Firm* — Greenblum & Bernstein, P.L.C.

(57) ABSTRACT

The aviation fuel oil base of the present invention is obtained by hydrotreating an oil to be treated containing an oxygen-containing hydrocarbon compound derived from an animal or vegetable oils and fat and a sulfur-containing hydrocarbon compound and then hydroisomerizing the resultant hydrotreated oil, wherein a yield of a fraction having a boiling range of 140 to 300° C. is 70 mass % or more; an isoparaffin content is 80 mass % or more; a content of isoparaffin having 2 or more branches is 17 mass % or more; an aromatic content is less than 0.1 vol %; an olefin content is less than 0.1 vol %; a sulfur content is less than 1 mass ppm; and an oxygen content is less than 0.1 mass %.

4 Claims, No Drawings

(56) References Cited

U.S. PATENT DOCUMENTS

| | | | |
|---|---|---|---|
| 2012/0209038 A1 | 8/2012 | Iguchi et al. | |
| 2012/0216449 A1 | 8/2012 | Hayasaka et al. | |
| 2014/0115954 A1* | 5/2014 | Koyama | C10G 3/50 |
| | | | 44/400 |
| 2014/0275689 A1* | 9/2014 | Petrovic | B01J 29/7661 |
| | | | 585/739 |

FOREIGN PATENT DOCUMENTS

| | | |
|---|---|---|
| GB | 2355725 | 10/1999 |
| JP | 2005-154647 | 6/2005 |
| JP | 2007-308565 | 11/2007 |
| JP | 2007-308566 | 11/2007 |
| JP | 2007-308569 | 11/2007 |
| JP | 2007-332360 | 12/2007 |
| JP | 2008-239876 | 10/2008 |
| JP | 2008-291274 | 12/2008 |
| JP | 2009-001722 | 1/2009 |
| JP | 2009-161669 | 7/2009 |
| WO | 2007-063874 | 6/2007 |
| WO | 2008/117856 | 2/2008 |
| WO | 2011/024997 | 3/2011 |

OTHER PUBLICATIONS

Sone et al., "Suisa Bio Keiyu (BHD) no Seizo Gijutsu", Material Stage, Feb. 2008, pp. 73-78.
Search report from International Application No. PCT/JP2010/064723, mail date is Oct. 12, 2010.
Search report from International Preliminary Report on Patentability and Written Opinion for International Application No. PCT/JP2010/064723, mail date is Mar. 22, 2012.
James D Kinder et al., "Evaluation of Bio-derived Synthetic Paraffinic Kerosenes (Bio-SPK)," Jun. 1, 2009.
Osman Ilke Senol, "Hydrogenation of Aliphatic and Aromatic Oxygenates on Sulphided Catalysts for Production of Second Generation Biofuels," Jan. 1, 2007.
Search Report for EP Application No. 10812043.7, mailed on Apr. 23, 2013.
"Database WPI Week 200743 Thompson Scientific, London, GB; AN-2007-446113," XP002695219, (Abstract of WO 2007-063874), Jun. 7, 2007.
Search Report issued with respect to European Patent Application No. 10812048.6, mailed Feb. 6, 2013.
Search report from P.C.T. (PCT/JP2010/064723), mail date is Mar. 22, 2012.
International Preliminary Report on Patentability for PCT/JP2010/064700, mailed Mar. 22, 2012.
International Preliminary Report on Patentability for PCT/JP2010/064724, mailed Apr. 5, 2012.
Bea, "Jet fuels need more kerosine", Hydrocarbon Processing, 1988, pp. 51-52.
Oda, "Basic knowledge on aircraft fuels", Koku Gijutsu, No. 501, 1996, pp. 17-23 accompanied by English translation.
International Search report for PCT/JP2010/064700, Mailed: Oct. 12, 2010.
English translation of International Preliminary Report on Patentability for PCT/JP2010/064700, Mailed: Mar. 22, 2012.
Tadahide, Sone, "Technique for Production of Bio Hydro-Fined Diesel (BHD)", Material Stage, vol. 7, No. 11, Feb. 2008, pp. 73-78 along with a partial English translation thereof.
Office Action for Japanese Application No. 2009-200777, mailed on May 14, 2013.
Search report from International Application No. PCT/JP2010/064724, mail date is Sep. 21, 2010.
U.S. Office Action in respect to U.S. Appl. No. 13/391,891, dated Sep. 6, 2013.
"Japanese Industrial Standard Aviation turbine fuels, JIS K 2209", Japanese Standards Association, Sep. 1, 1991.
"Criterion Mild Hydrocracking", Criterion Catalysts & Technologies, Criterion 424, 2005.
Chinese Office Action dated Oct. 8, 2013 of Chinese App. No. 201080038694.8.
Zhao Yang et al, "Advance in hydroprocessing technology of manufacturing diesel with high cetane number from vegetable oil", Chemical Industry and Engineering Progress, vol. 26, No. 10, Dec. 28, 2007, p. 1391-p. 1394.
Office Action for Japanese Patent Application No. 2009-200918, mailed on May 14, 2013.
Hitoshi Fujiwara, "Consumption of Fuel in Aircraft and Trends in Alternative Fuel," vol. 32, No. 7 (2009), Printed on Jun. 20, 2009, Published on Jul. 1, 2009, pp. 481-486; and a partial English translation thereof.
Yusinori Abe, "Operation of Flight Demonstration Using Biofuel," Aviation Engineering No. 651, Jun. 1, 2009, pp. 24-28; and a partial English translation thereof.
Office Action for Japanese Patent Application No. 2009-200695, mailed on May 14, 2013.
Donald A. Bea, "Jet Fuels need more Kerosine," Hydrocarbon Processing, the December issue, 1998, pp. 51-52.
Search Report for Application No. PCT/JP2010/064700, received on Apr. 23, 2013.
"Aviation Fuels Technical Review", Retrieved from the Internet: URL: http://www.skybrary.aero/bookshelf/books/2478.pdf [retrieved on Dec. 12, 2013], Jan. 1, 2006, XP055092985.
Office Action for Taiwanese Patent Application No. 099129315, which was mailed on Jul. 25, 2014.
Office Action issued in U.S. Appl. No. 14/148,012, dated Oct. 2, 2015.

* cited by examiner

FUEL OIL BASE AND AVIATION FUEL COMPOSITION CONTAINING SAME

This application is a Divisional of U.S. patent application Ser. No. 13/391,765, which is a National Stage of International Application No. PCT/JP2010/064723, filed Aug. 30, 2010, which claims priority to Japanese Application No. 2009-200777, filed Aug. 31, 2009. The disclosures of each of U.S. patent application Ser. No. 13/391,765 and International Application No. PCT/JP2010/064723 are expressly incorporated by reference herein in their entireties.

TECHNICAL FIELD

The present invention relates to an environment-friendly fuel oil base produced from an animal or vegetable oil and fat and/or a component derived from an animal or vegetable oil and fat, namely, a triglyceride-containing hydrocarbon as a raw material, and an aviation fuel composition containing the fuel oil base.

BACKGROUND ART

As a preventive measure against global warming, attention has been focused on efficient use of energy that biomass has. Of the biomass, plant-derived biomass energy has a nature of being so-called carbon neutral, since fixed carbon by photosynthesis from atmospheric carbon dioxide during the plant growing process, can be efficiently used, which means that atmospheric carbon dioxide will not increase in view of life cycle. Furthermore, also in view of oil-resource depletion and a rapid increase in the crude oil price, a biomass fuel has been expected to be a very promising petroleum-alternative energy.

Such use of biomass energy have been studied variously also in the field of transportation fuel. For example, if a fuel derived from an animal or vegetable oil can be used as a diesel fuel, the fuel is expected to play an efficient role in reducing a carbon dioxide emission due to synergetic effect with energy-efficiency of a diesel engine. As the diesel fuel using an animal or vegetable oil, fatty acid methyl ester oil (Fatty Acid Methyl Ester is abbreviated as "FAME") is generally known. FAME is produced by subjecting a triglyceride, which is a general structure of animal and vegetable oils, to a transesterification reaction with methanol, with the aid of the function of e.g., an alkali catalyst.

However, in the process for producing FAME, as is described in patent document 1 below, it is necessary to dispose glycerin produced as a by product. In addition, cost and energy are required for washing generated oil. These are pointed out as problems.

CITATION LIST

Patent Literature

Patent document 1: Japanese Patent Application Laid-Open Publication No. 2005-154647

SUMMARY OF INVENTION

Technical Problem

In the meantime, use of the FAME not only in a diesel fuel but also an aviation fuel oil called a jet fuel has been studied. Since the amount of fuel used in airplanes is enormously large, a recent rapid increase in crude oil price produces a significant effect. In the circumstances, a biomass fuel has attracted attention as an important item which not only prevents global warming but also plays a role as a petroleum alternative. Currently, in a plurality of airline companies, a mixed use of FAME and petroleum-based jet fuel is carried out even on a trial basis.

However, there are some concerns about low temperature performance and oxidation stability of FAME. Particularly, in aviation fuels, since they are exposed to extremely low temperature during the flight at a high altitude, extremely severe low-temperature performance standard is provided. Therefore, when FAME is used, actually it has no choice but to blend with a petroleum-based jet fuel and the blending amount (concentration) thereof has to be reduced. Furthermore, also with respect to oxidation stability, even though the aviation fuel standard admits addition of an antioxidant, in consideration of stability as a base, the blend ratio thereof has to be limited to a low concentration, similarly to the case of low temperature performance.

Other than FAME, a biomass fuel produced by the following methods has been investigated on its uses. More specifically, the biomass fuel is a hydrocarbon obtained from an animal or vegetable oil and fat (including alga) through a reaction performed in the presence of hydrogen and a catalyst under high temperature and pressure conditions. According to this method, it is possible to produce a hydrocarbon not containing oxygen and an unsaturated bond and having the same properties as those of petroleum-based hydrocarbon fuels, unlike FAME. If such a hydrocarbon can be used as an aviation fuel oil base, it can be used in a higher concentration than FAME, greatly contributing to reduction of environmental load in the aviation field. However, aviation fuels are required to satisfy the severe low-temperature performance standard (a freezing point: −47° C. or less) compared to diesel fuels, as described above. For this reason, conventional hydrocarbons obtained by hydrotreatment of an animal or vegetable oil and fat still require improvement to be used as an aviation fuel oil base.

The present invention has been attained in view of these circumstances. An object of the present invention is to provide an aviation fuel composition containing an environment-friendly base produced from an animal or vegetable oil and fat and/or a component derived from an animal or vegetable oil and fat, that is, triglyceride-containing hydrocarbons, having excellent life cycle $CO_2$ emission characteristics and oxidation stability and excellent low-temperature fluidity.

Solution to Problem

The aviation fuel oil base according to the present invention is obtained by hydrotreating an oil to be treated containing an oxygen-containing hydrocarbon compound derived from an animal or vegetable oil and fat and a sulfur-containing hydrocarbon compound and then hydroisomerizing the resultant hydrotreated oil, in the presence of hydrogen, in which a yield of a fraction having a boiling range of 140 to 300° C. is 70 mass % or more; an isoparaffin content is 80 mass % or more; a content of isoparaffin having 2 or more branches is 17 mass % or more; an aromatic content is less than 0.1 vol %; an olefin content is less than 0.1 vol %; a sulfur content is less than 1 mass ppm; and an oxygen content is 0.1 mass % or less.

The aviation fuel oil base according to the present invention has sufficient low temperature performance since the isoparaffin content and the content of isoparaffin having two or more branches satisfy the aforementioned conditions. By virtue of this, the base can be blended in a high concentration in preparing an aviation fuel composition. Note that, usually, when a process treatment for increasing an isomerization degree and a branching degree of paraffin is applied, the content of a light fraction increases by cracking; however, in the aviation fuel oil base of the present invention, a yield of the fraction having a boiling range of 140 to 300° C. is 70 mass % or more.

The oil to be treated preferably contains a petroleum-based base. The petroleum-based base mentioned herein refers to a fraction obtained by atmospheric distillation or vacuum distillation of crude oil and a fraction obtained through a reaction such as hydrodesulfurization, hydrocracking, fluid catalytic cracking or contact reforming, and a fraction obtained by refining a synthetic oil obtained from compounds derived from chemical products and via the Fischer-Tropsch reaction.

The hydrotreatment is preferably a step of hydrotreating the oil to be treated by using a catalyst prepared by supporting at least one metal selected from the elements of groups 6A and 8 of the periodic table on a support formed of a porous inorganic oxide composed of two or more elements selected from aluminum, silicon, zirconium, boron, titanium, and magnesium under the conditions of a hydrogen pressure of 2 to 13 MPa, a liquid hourly space velocity of 0.1 to 3.0 h$^{-1}$, a hydrogen/oil ratio of 150 to 1500 NL/L and a reaction temperature of 150 to 480° C. in the presence of hydrogen.

The hydroisomerization is preferably a step of isomerizing a hydrotreated oil obtained by the hydrotreatment by using a catalyst prepared by supporting a metal selected from the elements of group 8 of the periodic table on a support formed of a porous inorganic oxide composed of a substance selected from aluminum, silicon, zirconium, boron, titanium, magnesium, and zeolite under the conditions of a hydrogen pressure of 1 to 5 MPa, a liquid hourly space velocity of 0.1 to 3.0 h$^{-1}$, a hydrogen/oil ratio of 250 to 1500 NL/L, and a reaction temperature of 200 to 360° C. in the presence of hydrogen.

The aviation fuel composition of according to the present invention contains the aviation fuel oil base and has a sulfur content of 10 mass ppm or less and a freezing point of −47° C. or less.

The aviation fuel oil composition preferably contains at least one additive selected from an antioxidant, an antistatic, a metal deactivator, and an anti-icing agent. Furthermore, the aviation fuel oil composition preferably satisfies the standard value of an aviation turbine fuel defined by JIS K2209.

Advantageous Effects of Invention

According to the present invention, there is provided an aviation fuel oil composition having excellent life cycle $CO_2$ emission characteristics and oxidation stability, which have been rarely attained by conventional aviation fuel oil compositions, as well as excellent low-temperature fluidity by containing an environment-friendly light oil base produced from an oxygen-containing hydrocarbon compound derived from an animal or vegetable oil and fat.

DESCRIPTION OF EMBODIMENTS

The present invention will be more specifically described below. The aviation fuel oil composition of the present invention employs an environment-friendly aviation fuel oil base as a component.

(Aviation Fuel Oil Base)

The aviation fuel oil base of the present invention is a fraction having low sulfur and oxygen contents and obtained by hydrotreatment of a predetermined oil to be treated. More specifically, the base is obtained by hydrotreating the oil to be treated containing an oxygen-containing hydrocarbon compound derived from an animal or vegetable oil and fat and a sulfur-containing hydrocarbon compound in the presence of hydrogen, and then, applying hydroisomerization, and satisfies all of the following conditions.

(Conditions)

A fraction having a boiling range of 140 to 300° C.: 70 mass % or more (preferably, 75 mass % or more), The isoparaffin content: 80 mass % or more (preferably, 85 mass % or more), The content of isoparaffin having two or more branches: 17 mass % or more (preferably, 20 mass % or more), Aromatic content: less than 0.1 vol %, Olefin content: less than 0.1 vol %, Sulfur content: less than 1 mass ppm, Oxygen content: less than 0.1 mass %.

If the yield of the fraction having a boiling range of 140 to 300° C. is less than 70 mass %, an aviation fuel oil base cannot be sufficiently obtained. If the isoparaffin content is less than 80 mass %, the low-temperature performance standard as an aviation fuel oil is not satisfied. If the content of isoparaffin having two or more branches is less than 17 mass %, the low-temperature performance standard of an aviation fuel oil is not satisfied. If the olefin content exceeds 0.1 vol %, oxidation stability decreases. If the sulfur content exceeds 1 ppm, corrosiveness deteriorates. If the oxygen content exceeds 0.1 mass %, a heating value decreases and a specific fuel consumption decreases.

The oxygen-containing hydrocarbon compound must be an animal or vegetable oil and fat and/or a component derived from an animal and vegetable oil and fat. Examples of the animal and vegetable oil and fat include beef fat, rapeseed oil, camelina oil, soybean oil, palm oil, and oils and fats or hydrocarbons produced by specific mircoalga. The specific mircoalga refer to alga having a property of transferring a part of nutrient contents in the body into a hydrocarbon or an oil and fat. Examples thereof include Chlorella, Scenedesmus, Spirulina, Euglena, *Botryococcus braunii* and *Pseudochoricystis ellipsoidea*. It is known that Chlorella, Scenedesmus, Spirulina and Euglena produce oils and fats; whereas, *Botryococcus braunii* and *Pseudochoricystis ellipsoidea* produce hydrocarbons. In the present invention, any oil and fat may be used as the animal or vegetable oil or fat, or used oil and fat, that is, waste oil, may be used. Furthermore, for example, wax esters extracted from microalga and free fatty acids produced as byproducts during oil and fat refinement can be used. More specifically, the animal and vegetable oils and fats according to the present invention include the waste oils of the aforementioned oils and fats, wax esters extracted from microalga and free fatty acids produced as byproducts during oil and fat refinement. In view of the carbon neutral, oils and fats derived from plants are preferable. In view of a kerosene fraction yield after hydrotreatment, oils and fats, in which a composition ratio (fatty acid composition) of fatty acid groups having carbon chains of 10 to 14 carbon atoms is high, are preferable. Examples of the vegetable oils and fats conceivable in view of this include coconut oil, palm kernel oil, and camelina oil, and examples of the oils and fats produced by specific mircoalga include the oils and fats produced by Euglena. Note that these oils and fats can be used singly or as a mixture of two types or more.

Note that, the fatty acid composition refers to a value obtained by measuring methyl ester, which is prepared in accordance with the standard oil and fat analytical test method (defined by the Japan Oil Chemists' Society) (1991) "2.4.20.2-91 fatty acid methyl ester preparation method (boron trifluoride-methanol method)", in accordance with the standard oil and fat analytical test method (defined by the Japan Oil Chemists' Society) (1993) "2.4.21.3-77 fatty acid composition (FID programmed-temperature gas chromatography)" using a programmed-temperature gas chromatograph equipped with a hydrogen flame ionization detector (FID) and refers to a composition ratio (mass %) of fatty acid groups constituting an oil and fat.

Examples of a typical composition of the fatty acid moiety of a glyceride compound contained in these raw oils (animal and vegetable oils and fats and/or components derived from animal and vegetable oils and fats) include a fatty acid not containing an unsaturated bond in a molecular structure and called a saturated fatty acid, such as butyric acid ($C_3H_7COOH$), caproic acid ($C_5H_{11}COOH$), caprylic acid ($C_7H_{15}COOH$), capric acid ($C_9H_{19}COOH$), lauric acid ($C_{11}H_{23}COOH$), myristic acid ($C_{13}H_{27}COOH$), palmitic acid ($C_{15}H_{31}COOH$), stearic acid ($C_{17}H_{35}COOH$); and unsaturated fatty acids having one or a plurality of unsaturated bonds such as oleic acid ($C_{17}H_{33}COOH$), linoleic acid ($C_{17}H_{31}COOH$), linolenic acid ($C_{17}H_{29}COOH$) and ricinoleic acid ($C_{17}H_{32}(OH)COOH$). The hydrocarbon moieties of these fatty acids in naturally occurring substances are generally composed of linear chains in most cases. However, in the present invention, as long as the properties defined in the present invention are satisfied, a substance even if it has a structure with a side chain, in other words, even if it is an isomer, can be used. Furthermore, the position of an unsaturated bond in a molecule of an unsaturated fatty acid is not particularly limited as long as the properties defined in the present invention are satisfied. More specifically, not only an unsaturated fatty acid whose existence is generally confirmed in nature but also an unsaturated fatty acid whose unsaturated bond is set at arbitral site by chemical synthesis can be used.

The aforementioned raw oil contains one or a plurality of fatty acids as mentioned above. The types of fatty acids contained in the crude oil vary depending upon the raw material. For example, coconut oil contains relatively a large amount of saturated fatty acid such as lauryl acid and myristic acid; whereas soybean oil contains a large amount of unsaturated fatty acid such as oleic acid and linoleic acid.

The sulfur-containing hydrocarbon compound is not particularly limited; however, specific examples thereof include sulfide, disulfide, polysulfide, thiol, thiophene, benzothiophene, dibenzothiophene, and derivatives of these. The sulfur-containing hydrocarbon compound contained in the oil to be treated may be a single compound or a mixture of two or more compounds. Furthermore, a petroleum-based hydrocarbon fraction having a sulfur content may be blended with the oil to be treated.

The sulfur content contained in the oil to be treated is preferably 1 to 50 mass ppm in terms of a sulfur atom based on the total amount of oil to be treated, more preferably 5 to 30 mass ppm, and further preferably 10 to 20 mass ppm. If the content in terms of a sulfur atom is less than 1 mass ppm, it tends to be difficult to stably maintain a deoxidation activity. On the other hand, if the content exceeds 50 mass ppm, the concentration of sulfur in a light gas emitted in a hydrotreatment step increases, and in addition, the sulfur content in hydrorefined oil tends to increase. When it is used as a fuel such as an aviation fuel, adverse effects such as corrosion of members are worried about. Note that, in the present invention, the sulfur content refers to the sulfur content by mass measured in accordance with the "Determination of sulfur content" of JIS K 2541 or the method described in ASTM-5453.

The sulfur-containing hydrocarbon compound contained in the oil to be treated may be blended with an oxygen-containing hydrocarbon compound derived from an animal or vegetable oil and fat in advance, and then, the resultant mixture may be introduced in a reactor of a hydrorefining apparatus. Alternatively, when an oxygen-containing hydrocarbon compound derived from an animal or vegetable oil and fat is introduced in a reactor, the sulfur-containing hydrocarbon compound may be supplied upstream the reactor.

Examples of the petroleum-based base contained in the oil to be treated may include a straight-run gas oil obtained from an atomospheric ditillation unit of crude oil, a vacuum gas oil obtained by treating straight-run heavy oil and residue obtained from an atomospheric ditillation unit in a vacuum distillation unit, light cycle oil or hydrocracking gas oil obtained by catalytic cracking or hydrocracking a heavy vacuum gas oil or a desulfurized heavy oil, a hydrorefined gas oil or a hydrodesulfurized gas oil obtained by hydrorefining these petroleum-based hydrocarbons, and synthetic oil obtained from compounds derived from chemical products and via the Fischer-Tropsch reaction. These fractions may be contained in the oil to be treated singly or in combination with two or more as long as the sulfur content present in an aviation fuel oil base satisfies the aforementioned conditions. The content of petroleum-based base, which is obtained by refining e.g., crude oil, in the oil to be treated is not particularly limited; however, the content is preferably 20 to 70 vol %, and more preferably 30 to 60 vol %.

(Hydrotreatment Step)

The hydrotreatment for the oil to be treated according to the present invention preferably contains the following hydrotreatment step. In the hydrotreatment step according to the present invention, the treatment is desirably performed under the hydrotreatment conditions: a hydrogen pressure of 2 to 13 MPa, a liquid hourly space velocity of 0.1 to 3.0 $h^{-1}$, a hydrogen/oil ratio of 150 to 1500 NL/L and a reaction temperature of 150 to 480° C.; more desirably under the conditions: a hydrogen pressure of 2 to 13 MPa, a liquid hourly space velocity of 0.1 to 3.0 $h^{-1}$, a hydrogen/oil ratio of 150 to 1500 NL/L and a reaction temperature of 200 to 400° C.; and further more desirably under the conditions: a hydrogen pressure of 3 to 10.5 MPa, a liquid hourly space velocity of 0.25 to 1.0 $h^{-1}$, a hydrogen/oil ratio of 300 to 1000 NL/L and a reaction temperature of 260 to 360° C. These conditions are all the factors influencing a reaction activity. For example, in the case where the hydrogen pressure and hydrogen/oil ratio are less than the lower limits, a reduction of reactivity and rapid activity reduction may occur. In the case where the hydrogen pressure and hydrogen/oil ratio exceed the upper limits, large cost is required for equipment such as a compressor. The lower the liquid hourly space velocity is, the more favorably the reaction tends to proceed. In the case where the velocity is less than the aforementioned lower limit, an extremely large reaction tower volume is required, with the result that excessively large equipment cost tends to be required. On the other hand, in the case where the velocity exceeds the upper limit, the reaction may not sufficiently proceed as a tendency. In the case where the reaction temperature is less than 150° C., the reaction may not sufficiently proceed; whereas in the case where the temperature exceeds 480° C., cracking excessively proceeds, reducing a liquid product yield as a tendency.

As the hydrotreatment catalyst, a catalyst prepared by supporting a metal selected from the elements of groups 6A and 8 of the periodic table on a support formed of a porous inorganic oxide composed of two or more elements selected from aluminum, silicon, zirconium, boron, titanium, and magnesium.

As the support for a hydrotreatment catalyst, a porous inorganic oxide composed of two or more elements selected from aluminum, silicon, zirconium, boron, titanium, and magnesium is used. Generally, a porous inorganic oxide containing alumina is used. As other components constituting a support include silica, zirconia, boria, titania, and magnesia. Desirably, an oxide complex containing alumina and at least one selected from other components is used. As an example, silica-alumina is mentioned. Furthermore, as a component other than these, phosphorus may be contained. The total content of components except alumina is preferably 1 to 20 wt %, and desirably 2 to 15 wt %. In the case where the total content of the components except alumina is less than 1 wt %, a sufficient catalyst surface area cannot be obtained, with the result that activity may decrease. On the other hand, in the case where the content exceeds 20 wt %, the acidic property of the support increases, with the result that activity may reduce due to coke generation. In the case where phosphorus is contained as a component of the support, the content thereof is desirably 1 to 5 wt % in terms of an oxide, and further desirably 2 to 3.5 wt %.

The raw materials serving as precursors of silica, zirconia, boria, titania, and magnesia, which are the components of the support except alumina, are not particularly limited. A general solution containing silicon, zirconium, boron, titanium or magnesium can be used. For example, as to silicon, silicate, water glass and silica sol, etc., can be used. As to titanium, titanium sulfate, titanium tetrachloride and alkoxide salts, etc., can be used. As to zirconium, zirconium sulfate and alkoxide salts, etc. can be used. As to boron, boric acid etc. can be used. As to magnesium, magnesium nitrate, etc. can be used. As to phosphorus, phosphoric acid or an alkaline metal salt of phosphoric acid, etc., can be used.

Raw materials for the components of the support except alumina are desirably added in any one of the steps upstream of the baking step of the support. For example, they are added to an aqueous aluminum solution in advance, and thereafter, aluminum hydroxide gel containing these components may be prepared. Alternatively, they may be added to aluminum hydroxide gel prepared. Alternatively, they may be added in a kneading step in which water or an acidic aqueous solution is added to a commercially available alumina intermediate substance and boehmite powder and kneaded. However, a method of allowing them to coexist in a stage where aluminum hydroxide gel is prepared is more desirable. The effect expressing mechanism of the components of a support except alumina has not yet been elucidated; however, it is considered that they may form a state of an oxide complex with aluminum. This causes an increase in the surface area of the support and causes some interaction with an active metal and conceivably influences the activity.

Examples of the active metal of the hydrotreatment catalyst include at least one metal selected from groups 6A and 8 of the periodic table, and desirably two or more metals selected from the groups 6A and 8 of the periodic table. For example, Co—Mo, Ni—Mo, Ni—Co—Mo, Ni—W are mentioned. In the hydrotreatment, these metals are converted into sulfates and put in use.

The content of the active metal, for example, the total content of W and Mo is desirably 12 to 35 wt % in terms of an oxide relative to the weight of a catalyst, and more desirably 15 to 30 wt %. In the case where the total amount of W and Mo is less than 12 wt %, the number of active sites reduces, with the result that activity may reduce. In the case where the total amount exceeds 35 wt %, the metals do not effectively disperse, with the result that activity may also reduce. Furthermore, the total amount of Co and Ni is desirably 1.5 to 10 wt % in terms of an oxide based on the weight of a catalyst, and more desirably 2 to 8 wt %. In the case where the total amount of Co and Ni is less than 1.5 wt %, a sufficient promoter effect cannot be obtained, with the result that the activity may reduce. In the case where the total content exceeds 10 wt %, the metals do effectively disperse, with the result that activity may also decrease.

In any one of the hydrotreatment catalyst, a method for supporting an active metal on a support is not particularly limited. A known method applied to producing a general desulfurization catalyst can be used. Usually a method in which a catalyst support is impregnated with a solution containing a salt of an active metal is preferably employed. Furthermore, e.g., an equilibrium adsorption method, a Pore-filling method, and an Incipient-wetness method are preferably employed. For example, the Pore-filling method is a method in which the volume of micro pores of a support is measured in advance and then the support is impregnated with a metal salt solution of the same volume as this. However, the impregnation method is not particularly limited. Impregnation can be performed by an appropriate method depending upon the amount of metal supported and the physical properties of a catalyst support.

The system of a hydrotreatment reactor may be an immobilized bed system. More specifically, hydrogen may be supplied either countercurrently or concurrently to the oil to be treated. Alternatively, when a hydrotreatment reactor has a plurality of reactors, counter current supply and concurrent supply may be used in combination. Generally, a downflow system is employed and a gas-liquid concurrent supply system can be employed. Furthermore, a single reactor is used alone or a plurality of reactors may be used in combination. Alternatively, a single reactor partitioned into a plurality of portions having catalyst beds placed therein may be employed. In the present invention, hydrotreated oil obtained by hydrotreatment in a reactor is subjected to a gas-liquid separation step and a rectification step, etc., and then, fractionated into predetermined fractions. At this time, to remove water and byproduct gases such as carbon monoxide, carbon dioxide, and hydrogen sulfide generated with the progress of a reaction, a gas-liquid separation unit and another byproduct gas removing apparatus may be provided between a plurality of reactors and in product recovery step. As the apparatus for removing byproducts, a high-pressure separator, etc. can be preferably mentioned.

Generally, hydrogen gas is introduced from an inlet of a first reactor together with the oil to be treated before and after it passes through a heating furnace. Separately from this, hydrogen gas may be introduced into the space between catalyst beds and the space between a plurality of reactors in order to control the temperature within the reactor and maintain hydrogen pressure throughout the reactor as much as possible. The hydrogen introduced for this purpose is called quench hydrogen. At this time, the ratio of quench hydrogen to hydrogen introduced together with the oil to be treated is desirably 10 to 60 vol %, and more desirably 15 to 50 vol %. In the case where the ratio of quench hydrogen is less than 10 vol %, a reaction may not sufficiently proceed in a later reaction site. In the case where the quench hydrogen exceeds 60 vol %, a reaction may not sufficiently proceed in the proximity of a reactor inlet.

In the method for producing the aviation fuel oil base of the present invention method, to suppress the heating value of a hydrotreatment reactor in hydrotreating the oil to be treated, a predetermined amount of recycled oil can be added to the oil to be treated. The content of the recycled oil is preferably 0.5 to 5 times by mass relative to an oxygen-containing hydrocarbon compound derived from an animal or vegetable oil and fat. The ratio can be appropriately determined within the aforementioned range in accordance with the maximum working temperature of a hydrotreatment reactor. This is because, assuming that specific heating values of both oils are equal, if they are blended in the same ratio, a temperature increase is as low as a half of the case where a substance derived from an animal or vegetable oil and fat is reacted alone, thereby sufficiently and successfully reducing the reaction heat within the aforementioned range. Note that if the content of the recycled oil is larger than 5 times by mass of an oxygen-containing hydrocarbon compound, the concentration of the oxygen-containing hydrocarbon compound reduces and the reactivity reduces. Furthermore, a flow rate through a pipe etc. increases and load increases. On the other hand, if the content of the recycled oil is less than 0.5 times by mass of the oxygen-containing hydrocarbon compound, a temperature increase cannot be sufficiently suppressed.

The method of blending the oil to be treated and recycled oil is not particularly limited. For example, they are blended in advance and the resultant mixture may be introduced in a reactor of a hydrotreatment apparatus. Alternatively, when the oil to be treated is introduced in a reactor, the recycled oil may be supplied upstream of the reactor. Furthermore, when a plurality of reactors are connected in series, recycled oil may be introduced between the reactors. Alternatively, when the catalyst layer is divided into a plurality of catalyst layers in a single reactor, recycled oil may be introduced between the catalyst layers.

Furthermore, recycled oil preferably contains a part of the hydrotreated oil obtained by hydrotreating the oil to be treated and removing by products such as water, carbon monoxide, carbon dioxide, and hydrogen sulfide, and further preferably contains a part of the light fraction, middle fraction or heavy fraction, which is obtained from the hydrotreated oil by fractionation and isomerized, or a part of the middle fraction obtained from a hydrotreated oil further isomerized by fractionation.

(Hydroisomerization Step)

In the hydrotreatment of the present invention, it is necessary to have a step (second hydrotreatment step) in which the hydrotreated oil obtained in the hydrotreatment step is further hydroisomerized.

The sulfur content in hydrotreated oil, which serves as raw oil for hydroisomerization, is preferably 1 mass ppm or less, and more preferably 0.5 mass ppm. When the sulfur content exceeds 1 mass ppm, hydroisomerization may be prevented from proceeding. In addition, for the same reason, the concentration of the sulfur content in a hydrogen-containing reaction gas introduced together with hydrotreated oil, must be sufficiently low, and is preferably 1 vol. ppm or less, and more preferably 0.5 vol. ppm or less.

The isomerization step is desirably performed in the presence of hydrogen in the conditions: a hydrogen pressure of 1 to 5 MPa, a liquid hourly space velocity of 0.1 to 3.0 $h^{-1}$, a hydrogen/oil ratio of 250 to 1500 NL/L and a reaction temperature of 200 to 360° C.; and more desirably a hydrogen pressure of 0.3 to 4.5 MPa, a liquid hourly space velocity of 0.5 to 2.0 $h^{-1}$, a hydrogen/oil ratio of 380 to 1200 NL/L and a reaction temperature of 220 to 350° C.; and further desirably a hydrogen pressure of 0.5 to 4.0 MPa, a liquid hourly space velocity of 0.8 to 1.8 $h^{-1}$, a hydrogen/oil ratio of 350 to 1000 NL/L and a reaction temperature of 250 to 340° C. These conditions are all the factors influencing reaction activity. For example, in the case where the hydrogen pressure and hydrogen/oil ratio are less than the lower limits, a reduction of reactivity and rapid activity reduction may occur. In the case where hydrogen pressure and hydrogen/oil ratio exceed the upper limits, large cost is required for equipment such as a compressor. The lower the liquid hourly space velocity is, the more favorably the reaction tends to proceed. In the case where the velocity is less than the aforementioned lower limit, an extremely large reaction tower volume is required, with the result that excessively large equipment cost tends to be required. On the other hand, in the case where the velocity exceeds the upper limit, the reaction may not sufficiently proceed. In the case where the reaction temperature is less than the lower limit, a sufficient hydroisomerization reaction may not proceed; whereas in the case where the temperature exceeds the upper limit, excessive cracking or other side reactions proceed, reducing a liquid product yield as a tendency.

As the hydroisomerization catalyst, a catalyst prepared by supporting at least one metal selected from the elements of group 8 of the periodic table on a support formed of a porous inorganic oxide composed of at least one substance selected from aluminum, silicon, zirconium, boron, titanium, magnesium, and zeolite is used.

The porous inorganic oxide used as a support of a hydroisomerization catalyst includes alumina, titania, zirconia, boria, silica or zeolite. Of them, at least one of zirconia, boria, silica and zeolite is used in combination with alumina to compose the porous inorganic oxide in the present invention. A production method thereof is not particularly limited. Any preparation method using raw materials in the state of sol corresponding to individual elements and salt compounds can be employed. Furthermore, preparation may be made by once preparing a complex hydroxide or a complex oxide such as silica alumina, silica zirconia, alumina titania, silica titania, and alumina boria, and thereafter, adding the resultant complex in an arbitrary step of the preparation step in the state of alumina gel and in other states such as a hydroxide state or an appropriate solution state. The ratio of alumina to other oxides may be arbitrarily set relative to a support; however, it is preferable that the ratio of alumina is 90 mass % or less, further preferably 60 mass % or less, more preferably 40 mass % or less, preferably 10 mass % or more and more preferably 20 mass % or more.

Zeolite is crystalline aluminosilicate such as faujasite, pentasil, Mordenite, TON, MTT and MRE. Zeolite, which is extremely sufficiently stabilized by a predetermined hydrothermal treatment and/or an acid treatment, or zeolite whose alumina content is controlled can be used. Preferably, faujasite and mordenite, and particularly preferably, Y type and beta type are used. As the Y type, extremely sufficiently stabilized one is preferable. When the zeolite is extremely sufficiently stabilized by a hydrothermal treatment, micro pores having a size within 20 to 100 Å range are newly formed in addition to an intrinsic micro porous structure having a size of 20 Å or less and called micro pores. As the hydrothermal treatment, known conditions can be used.

As the active metal of a hydroisomerization catalyst, at least one metal selected from group 8 of the periodic table is used. Of these metals, at least one metal selected from Pd, Pt, Rh, Ir, Au, and Ni is preferably used, and combination use is more preferable. Examples of a preferable combination include Pd—Pt, Pd—Ir, Pd—Rh, Pd—Au, Pd—Ni, Pt—Rh, Pt—Ir, Pt—Au, Pt—Ni, Rh—Ir, Rh—Au, Rh—Ni, Ir—Au, Ir—Ni, Au—Ni, Pd—Pt—Rh, Pd—Pt—Ir, and Pt—Pd—Ni. Of them, combinations such as Pd—Pt, Pd—Ni, Pt—Ni, Pd—Ir, Pt—Rh, Pt—Ir, Rh—Ir, Pd—Pt—Rh, Pd—Pt—Ni and Pd—Pt—Ir are more preferable. Combinations such as Pd—Pt, Pd—Ni, Pt—Ni, Pd—Ir, Pt—Ir, Pd—Pt—Ni and Pd—Pt—Ir are further more preferable.

As the total content of an active metal based on a catalyst mass, 0.1 to 2 mass % in terms of a metal is preferable, 0.2 to 1.5 mass % is more preferable, and 0.5 to 1.3 mass % is further more preferable. When the total amount of metal supported is less than 0.1 mass %, the number of active sites reduces, with the result that sufficient activity cannot be obtained, as a tendency. On the other hand, when the total amount exceeds 2 mass %, metals do not effectively disperse, with the result that sufficient activity is cannot be obtained as a tendency.

In any one of the aforementioned hydroisomerization catalysts, a method for supporting an active metal on a support is not particularly limited. A known method that is applied to the case where a general desulfurization catalyst is produced can be used. Usually, a method in which a catalyst support is impregnated with a solution containing an active metal salt is preferably employed. Also, an equilibrium adsorption method, a Pore-filling method and an Incipient-wetness method, etc., are preferably employed. For example, the Pore-filling method is a method in which the volume of micro pores of a support is measured in advance and the support is impregnated with a metal salt solution of the same volume as this. However, the impregnation method is not particularly limited. Impregnation can be performed by an appropriate method depending upon the amount of metal supported on the support and the physical properties of a catalyst support.

In the isomerization catalyst used in the present invention, an active metal contained in the catalyst is preferably reduced before the catalyst is subjected to a reaction. Reduction conditions are not particularly limited; however, the catalyst is reduced by treating it under hydrogen gas flow at a temperature of 200 to 400° C., preferably within the range of 240 to 380° C. In the case where the reduction temperature is less than 200° C., reduction of an active metal does not sufficiently proceed, with the result that hydrodeoxidation and hydroisomerization activities may not be exerted. Furthermore, in the case where a reduction temperature exceeds 400° C., aggregation of an active metal proceeds. Similarly to above, the activity may not be exerted.

The system of a reactor for hydroisomerization may be an immobilized bed system. More specifically, hydrogen may be supplied either countercurrently or concurrently to the raw oil. Alternatively, when a hydroisomerization reactor has a plurality of reactors, counter current supply and concurrent supply may be used in combination. Generally, a downflow system is employed and a gas-liquid concurrent supply system can be employed. Furthermore, a single reactor is used alone or a plurality of reactors may be used in combination. Alternatively, a single reactor portioned into a plurality of portions having catalyst beds are placed therein may be employed.

Generally, hydrogen gas is introduced from an inlet of a first reactor together with a raw oil before and after it passes through a heating furnace. Separately from this, hydrogen gas may be introduced into the space between catalyst beds and the space between a plurality of reactors in order to control the temperature within the reactor and maintain hydrogen pressure throughout the reactor as much as possible. The hydrogen introduced for this purpose is called quench hydrogen. At this time, the ratio of quench hydrogen to hydrogen introduced together with the raw oil is desirably 10 to 60 vol %, and more desirably 15 to 50 vol %. In the case where quench hydrogen is less than 10 vol %, a reaction may not sufficiently proceed in a later reaction site. In the case where the quench hydrogen exceeds 60 vol %, a reaction may not sufficiently proceed in the proximity of a reactor inlet.

The hydroisomerized oil obtained after the hydroisomerization step may be fractionated, if necessary, into a plurality of fractions in a rectification tower, for example, into a light fraction such as gas and naphtha fractions, a middle fraction such as kerosene, jet, and diesel oil fractions, and heavy fractions such as residual fractions. In this case, the cut temperature between the light fraction and the middle fraction is preferably 100 to 200° C., more preferably 120 to 180° C., further preferably 120 to 160° C., and further more preferably 130 to 150° C. The cut temperature between the middle fraction and the heavy fraction is preferably 250 to 360° C., more preferably 250 to 320° C., further preferably, 250 to 300° C., and further more preferably 250 to 280° C. Such a light hydrocarbon fraction is partly reformed in a water vapor reforming apparatus to thereby produce hydrogen. Hydrogen thus produced has a characteristic of carbon neutral since a raw material subjected to water vapor reforming is a biomass-derived hydrocarbon and thus can reduce environmental load. Note that, the middle fraction obtained by fractionating hydroisomerized oil can be suitably used as an aviation fuel oil base.

(Aviation Fuel Oil Composition)

The aviation fuel oil composition of the present invention contains the aforementioned aviation fuel oil base and has a sulfur content of 10 mass ppm or less and a freezing point of −47° C. or less. In the present invention, the environment-friendly aviation fuel oil base produced above and a hydrorefined oil refined from e.g., crude oil are blended to produce an aviation fuel oil composition satisfying predetermined performance. The content of an aviation fuel oil base relative to the aviation fuel oil composition of the present invention is not particularly limited; however, in view of reducing environmental load, the content is preferably 1 vol % or more, more preferably 3 vol % or more, and further preferably 5 vol % or more. The petroleum-based base obtained by refining e.g., crude oil refers to as a fraction obtained by atmospheric ditillation or vacuum distillation of crude oil and a fraction obtained by hydrodesulfurization, hydrocracking, fluid catalytic cracking and catalytic reforming. Furthermore, petroleum-based base obtained by refining e.g., crude oil may be a synthetic oil obtained from compounds derived from chemical products and via the Fischer-Tropsch reaction.

In the aviation fuel oil composition of the present invention, various types of additives that are used in conventional aviation fuel oils can be used. As the additives, at least one additive selected from an antioxidant, an antistatic, a metal deactivator, and an anti-icing agent is mentioned.

As the antioxidant, a mixture of N,N-diisopropylparaphenylenediamine, 2,6-ditertiary-butylphenol (75% or more) and tertiary- and tritertiary-butylphenol (25% or less), a mixture of 2,4-dimethyl-6-tertiary-butylphenol (72% or more) and monomethyl- and dimethyl-tertiary-butylphenol (28% or less), a mixture of 2,4-dimethyl-6-tertiary-butyl-phenol (55% or more) and tertiary- and ditertiary-butylphenol (45% or less), and 2,6-ditertiarybutyl-4-methylphenol can be added within the range of 24.0 mg/l in order to suppress generation of gum in an aviation fuel oil.

As the antistatic, STADIS450 manufactured by Octel can be added within the range of 3.0 mg/l in order to prevent accumulation of static electricity generated by friction with the inner wall of a pipe when an aviation fuel oil flows through a fuel pipe system at a high rate and to enhance electro conductivity.

As the metal deactivator, e.g., N,N-disalicylidene-1,2-propanediamine can be added within the range of 5.7 mg/l such that a fuel will not lose stability by the reaction of free metal components contained in an aviation fuel oil.

As the anti-icing agent, e.g., ethylene glycol monomethyl ether can be added within the range of 0.1 to 0.15 vol % in order to prevent a small amount of water in aviation fuel oil from freezing and clogging a pipe.

With the aviation fuel oil composition of the present invention, optional additives such as an antistatic agent, a corrosion inhibitor and a disinfectant can be appropriately blended without departing from the range of the present invention.

The aviation fuel oil composition of the present invention satisfies the standard value of JIS K2209 "Aviation turbine fuels".

The density at 15° C. of the aviation fuel oil composition of the present invention is preferably 0.775 g/cm$^3$ or more, and more preferably 0.780 g/cm$^3$ or more, in view of specific fuel consumption. On the other hand, the density is preferably 0.839 g/cm$^3$ or less, more preferably 0.830 g/cm$^3$ or less, and further preferably 0.820 g/cm$^3$ or less, in view of combustibleness. Note that the density at 15° C. mentioned herein refers to a value obtained by measurement in accordance with JIS K2249 "Crude Oil and Petroleum Products—Determination of density and petroleum measurement tables based on reference temperature (15° C.)".

As the distillation properties of the aviation fuel oil composition of the present invention, 10 vol % distillation temperature is preferably 204° C. or less, and more preferably 200° C. or less in view of vaporization characteristics. The end point thereof is preferably 300° C. or less, more preferably 290° C. or less, and further preferably 280° C. or less, in view of combustion characteristics (complete combustion characteristic). Note that, the distillation properties mentioned herein refers to values obtained by measurement in accordance with JIS K2254 "Petroleum Products—Determination of distillation characteristics".

The existent gum content in the aviation fuel oil composition of the present invention is preferably 7 mg/100 ml or less, more preferably 5 mg/100 ml or less, and further preferably 3 mg/100 ml or less, in view of preventing failure in e.g., a fuel introduction system caused by precipitate generation. Note that the existent gum content mentioned herein refers to a value obtained by measurement in accordance with JIS K2261 "Motor gasoline and aviation fuels—Determination of existent gum".

The net heat of combustion of the aviation fuel oil composition of the present invention is preferably 42.8 MJ/kg or more, and more preferably 45 MJ/kg or more, in view of specific fuel consumption. Note that the net heat of combustion mentioned herein refers to a value obtained by measurement in accordance with JIS K2279 "Crude Oil and petroleum products—Determination of heat of combustion".

As the kinematic viscosity of the aviation fuel oil composition of the present invention, the kinematic viscosity at −20° C. is preferably 8 mm$^2$/s or less, more preferably 7 mm$^2$/s or less, and further preferably 5 mm$^2$/s or less in view of fluidity in a fuel pipe and attaining uniform fuel spray. Note that the kinematic viscosity mentioned herein refers to a value obtained by measurement in accordance with JIS K2283 "Crude petroleum and petroleum products—Determination of kinematic viscosity".

The copper strip corrosion of the aviation fuel oil composition of the present invention is preferably 1 or less in view of corrosion of a fuel tank and a pipe. The copper strip corrosion refers to a value obtained by measurement in accordance with JIS K2513 "Petroleum Products—Corrosiveness to copper-Copper strip test".

The aromatic content of the aviation fuel oil composition of the present invention is preferably 25 vol % or less, and more preferably 20 vol %, in view of combustibleness (prevention of soot generation). The aromatic content mentioned herein refers to a value obtained by measurement in accordance with JIS K2536 "Liquid petroleum products—Testing method of components".

The smoke point of the aviation fuel oil composition of the present invention is preferably 25 mm or more, more preferably 27 mm or more, and further preferably 30 mm or more, in view of combustibleness (prevention of soot generation). Note that, the smoke point mentioned herein refers to a value obtained by measurement in accordance with JIS K2537 "Petroleum products—Kerosine and aviation turbine fuels—Determination of smoke point".

The sulfur content of the aviation fuel oil composition of the present invention is preferably 0.3 mass % or less, more preferably 0.2 mass % or less, and further preferably 0.1 mass % or less, in view of corrosiveness. Furthermore, similarly in view of corrosiveness, the mercaptan sulfur content is preferably 0.003 mass % or less, more preferably 0.002 mass % or less, and further preferably 0.001 mass % or less. Note that the sulfur content mentioned herein refers to a value obtained by measurement in accordance with JIS K2541 "Crude Oil and Petroleum Products—Determination of sulfur content" and the mercaptan sulfur content refers to a value obtained by measurement in accordance with JIS K2276 "Determination of mercaptan sulfur in light and middle distillates fuels (potentiometric method)".

The flash point of the aviation fuel oil composition of the present invention is preferably 38° C. or more, more preferably 40° C. or more and further preferably 45° C. or more, in view of safety. Note that the flash point mentioned herein refers to a value obtained by measurement in accordance with JIS K2265 "Crude Oil and Petroleum Products—Determination of flash point—Tag Closed Cup Method".

The total acid value of the aviation fuel oil composition of the present invention is preferably 0.1 mg KOH/g or less, more preferably 0.08 mg KOH/g or less, and further preferably 0.05 mg KOH/g or less in view of corrosiveness. Note that the total acid value mentioned herein refers to a value obtained by measurement in accordance with JIS K2276 "Determination of the Total Acid Value".

The freezing point of the aviation fuel oil composition of the present invention is preferably −47° C. or less, more preferably −48° C. or less, and further preferably −50° C. or less, in view of preventing fuel supply reduction due to fuel freezing caused by low-temperature exposure during aviation. Note that the freezing point mentioned herein refers to a value obtained by measurement in accordance with JIS K2276 "Determination of the freezing point of aviation fuels.

As the thermal stability of the aviation fuel oil composition of the present invention, the filter pressure drop in the method A is preferably 10.1 kPa or less, the preheat tube deposit rating is less than 3 in Method A; and the filter pressure drop in the method B is preferably 3.3 kPa or less, the preheat tube deposit rating is less than 3 in Method B in view of e.g., preventing clogging of a fuel filter caused by a precipitation during high temperature exposure time. Note that the thermal stability mentioned herein refers to a value obtained by measurement in accordance with JIS K2276 "Determination of thermal oxidation stability of gas turbine fuels—JETOT method Method A, Method B."

As the water solubility of the aviation fuel oil composition of the present invention, the water solubility in the separated state is preferably 2 or less and the water solubility in the interface state is preferably 1b or less in view of preventing troubles due to freezing of dissolved water during low temperature exposure time. Note that the water solubility mentioned herein refers to a value obtained by measurement in accordance with JIS K2276 "Determination of the water reaction of aviation fuels.

The aviation fuel oil base of the present invention containing an environment-friendly base produced from an animal or vegetable oil and fat and aviation fuel oil composition are excellent all in combustibleness, oxidation stability and life cycle $CO_2$ emission characteristics.

EXAMPLES

The present invention will be more specifically described based on Examples and Comparative Examples below; however, the present invention is not limited to these examples.

(Preparation of Catalyst)
<Catalyst A>

To a 5 mass % aqueous sodium aluminate solution (3000 g), water glass No. 3 (18.0 g) was added. The resultant mixture was placed in a container kept warm at 65° C. On the other hand, in another container kept warm at 65° C., a solution was prepared by adding 6.0 g of phosphoric acid (concentration: 85%) to 3000 g of a 2.5 mass % aluminum sulfate solution. To this, the aforementioned aqueous sodium aluminate solution was added dropwise. The end point thereof was defined as a time point when the pH of the solution mixture became 7.0. The resultant slurry product was passed through a filter to obtain cake-like slurry.

The cake-like slurry was transferred to a container equipped with a reflux condenser. Distilled water (150 ml) and a 27% aqueous ammonia solution (10 g) were added and stirred while heating at 75° C. for 20 hours. The slurry was placed in a kneader and kneaded while removing a water content by heating to 80° C. or more to obtain a clay-state kneaded product. The resultant kneaded product was extruded by an extruder to extrude a cylindrical product having a diameter of 1.5 mm. After dried at 110° C. for one hour, the cylindrical product was calcined at 550° C. to obtain a extruded support.

The resultant extruded support (50 g) was placed in an eggplant flack. An impregnation solution containing molybdenum trioxide (17.3 g), nickel (II) nitrate 6-hydrate (13.2 g), 3.9 g of phosphoric acid (concentration: 85%) and malic acid (4.0 g) was poured in the flask while deaerating by a rotary evaporator. After dried at 120° C. for one hour, the sample impregnated was calcined at 550° C. to obtain catalyst A. The physical properties of catalyst A are shown in Table 1.

<Catalyst B>
The silica alumina support (50 g) having a silica-alumina ratio (mass ratio) of 70:30 was placed in an eggplant flask. An aqueous tetraammin platinum (II) chloride solution was poured in the flask while deaerating by a rotary evaporator. After dried at 110° C., the sample impregnated was calcined at 350° C. to obtain catalyst B. The amount of platinum supported on catalyst B was 0.5 mass % based on the total catalyst amount. The physical properties of catalyst B are shown in Table 1.

<Catalyst C>
In accordance with the method described in the Non-Patent Document (Appl. Catal. A, 299 (2006), pages 167-174), ZSM-48 zeolite was synthesized. The synthesized ZSM-48 zeolite was dried under aeration at 95° C. for 3 hours and then calcined under air atmosphere at 550° C. for 3 hours to obtain calcined zeolite.

As an alumina binder, commercially available boehmite powder (trade name: Cataloid-AP) was prepared. An appropriate amount of water was added to prepare slurry-state boehmite powder. The calcined zeolite and the boehmite powder were sufficiently kneaded so as to obtain a ratio of zeolite:alumina of 70:30 (mass %) to obtain a kneaded product. The kneaded product was supplied to an extruder to obtain a cylindrically extruded support (diameter: 1.5 mm, length: 1 cm). The resultant extruded support was dried under aeration at 95° C. for 3 hours, and thereafter, calcined under air atmosphere at 550° C. for 3 hours.

The calcined extruded support (50 g) was placed in an eggplant flask. While deaerating by a rotary evaporator, dinitrodiamino platinum and dinitrodiamino palladium were added. The extruded support was impregnated with these substances to obtain an impregnated sample. The impregnation amount was adjusted such that the amounts of platinum and palladium to be supported became 0.3 mass % and 0.3 mass %, respectively based on the catalyst obtained. The impregnated sample was dried under air atmosphere at 120° C. for one hour and thereafter calcined under air atmosphere at 550° C. to obtain catalyst C. The properties of catalyst C are shown in Table 1.

Example 1

A reaction tube (inner diameter: 20 mm) charged with catalyst A (100 ml) was provided countercurrently to an immobilized-bed flow reactor. Thereafter, using a straight-run gas oil (sulfur content: 3 mass %) having dimethyl disulfide added thereto, preliminary sulfurization of a catalyst was performed under the conditions: a catalyst layer average temperature of 300° C., a hydrogen partial pressure of 6 MPa, a liquid hourly space velocity of 1 $h^{-1}$, and a hydrogen/oil ratio of 200 NL/L for 4 hours.

After the preliminary sulfurization, to vegetable oil and fat 1 having properties shown in Table 2, a part of the hydrotreated oil, after it was introduced into a high pressure separator (described later), was recycled such that the amount of part of the hydrotreated oil became to be equal by mass to vegetable oil and fat 1. Then, dimethylsulfide was added such that the amount of the sulfur content (in terms of a sulfur atom) became 10 mass ppm relative to the oil to be treated to prepare the oil to be treated. Thereafter, the oil to be treated was hydrotreated. Furthermore, the hydrotreatment conditions were set as follows: a catalyst layer average temperature (reaction temperature) of 300° C., a hydrogen pressure of 6.0 MPa, a liquid hourly space velocity of 1.0 $h^{-1}$, and a hydrogen/oil ratio of 500 NL/L. After the hydrotreatment, the treated oil was introduced into a high-pressure separator to remove hydrogen, hydrogen sulfide, carbon dioxide, and water from the treated oil.

A part of the hydrotreated oil, after it was introduced into a high pressure separator, was cooled by cooling water to 40° C. and recycled to the vegetable oil and fat serving as a raw oil, as described above. The remaining hydrotreated oil after recycled was introduced into an immobilized-bed flow reactor (isomerization apparatus) equipped with a reaction tube (inner diameter: 20 mm) charged with catalyst B (150 ml) to perform hydroisomerization. First, catalyst B was reduced under the conditions: a catalyst layer average temperature of 320° C., a hydrogen pressure of 5 MPa, and a hydrogen gas flow rate of 83 ml/min for 6 hours. Next, hydroisomerization was performed under the conditions: a catalyst layer average temperature (reaction temperature) of 320° C., a hydrogen pressure of 3 MPa, a liquid hourly space velocity of 1.0 $h^{-1}$, and a hydrogen/oil ratio of 500 NL/L. After the isomerization, the hydroisomerized oil was guided to a rectification tower and fractionated into a light fraction having a boiling range of less than 140° C., a middle fraction of 140 to 300° C., and a heavy fraction of beyond 300° C. Of these fractions, the middle fraction having a boiling range of 140 to 300° C. was used as aviation fuel oil base 1. The hydrotreatment conditions and hydroisomerization conditions and the properties of the resultant aviation fuel oil base 1 are shown in Table 3.

Examples 2 to 4, Comparative Examples 1 to 4

The same treatment was performed as in Example 1 except that the catalysts, vegetable oils and fats, the reaction conditions of the hydrotreatment step and the reaction conditions of hydroisomerization step described in Table 3 were employed. The properties of resultant aviation fuel oil bases 2 to 8 are shown together in Table 3.

Furthermore, as a petroleum-based aviation fuel oil base, a hydrodesulfurized base obtained by treating straight-run kerosene obtained from an atmospheric distillation unit of crude oil in the conditions: a reaction temperature of 320° C., a hydrogen pressure of 3 MPa, a LHSV of 3.0 $h^{-1}$, and a hydrogen/oil ratio of 150 NL/L, was used. The properties thereof are shown in Table 2

TABLE 1

|  | Catalyst A | Catalyst B | Catalyst C |
|---|---|---|---|
| $Al_2O_3$ Content (mass %, based on support mass) | 91.2 | 30.0 | 30.0 |
| $SiO_2$ Content (mass %, based on support mass) | 4.8 | 70.0 | 0.0 |
| $P_2O_5$ Content (mass %, based on support mass) | 4.0 | 0.0 | 0.0 |
| Crystalline Substance Content (mass %, based on support mass) | — | — | 70 |
| Name of Crystalline Substance | — | — | MRE |
| $MoO_3$ Content (mass %, based on catalyst mass) | 24.0 | 0.0 | 0.0 |
| NiO Content (mass %, based on catalyst mass) | 2.6 | 0.0 | 0.0 |
| Pt Content (mass %, based on catalyst mass) | 0.0 | 0.5 | 0.3 |
| Pd Content (mass %, based on catalyst mass) | 0.0 | 0.0 | 0.3 |

TABLE 2

| | | Vegetable Oil and Fat 1 (palm oil) | Vegetable Oil and Fat 2 (coconut oil) | Petroleum-based Aviation Fuel Base |
|---|---|---|---|---|
| Density at 15° C. (kg/$m^3$) | | 916 | 900 | 790 |
| Kinematic Viscosity at 30° C. ($mm^2$/s) | | — | — | 1.3 |
| Elemental Analysis | C (mass %) | 77.3 | 77.0 | 85.0 |
| | H (mass %) | 12.0 | 12.0 | 15.0 |
| Oxygen Content (% by mass) | | 10.6 | 11.5 | <0.1 |
| Sulfur Content (% by mass) | | <1 | <1 | 0.05 |
| Acid Value (mgKOH/g) | | 0.07 | 0.10 | 0.00 |
| Composition Ratio (mass %) of Fatty Acid Groups in Oil and Fat (number of carbon atoms in fatty acid carbon chain) | Butyric Acid Group (C3) | 0 | 0 | — |
| | Caproic Acid Group (C5) | 0 | 0 | — |
| | Caprylic Acid Group (C7) | 0 | 4 | — |
| | Capric Acid Group (C9) | 0 | 4 | — |
| | Lauric Acid Group (C11) | 0 | 49 | — |
| | Myristic Acid Group (C13) | 1 | 17 | — |
| | Palmitic Acid Group (C14) | 44 | 9 | — |
| | Stearic Acid Group (C16) | 5 | 3 | — |
| | Oleic Acid Group (C17) | 39 | 7 | — |
| | Linoleic Acid Group (C17) | 10 | 2 | — |
| | Linolenic Acid Group (C17) | 0 | 0 | — |

Examples 4 to 8 and Comparative Examples 6 and 7

The environment-friendly aviation fuel oil bases having the properties shown in Table 3 and the petroleum-based aviation fuel oil bases having the properties shown in Table 2 were blended to prepare the aviation fuel oil compositions shown in Table 4. Note that the following additives were added to any one of Examples 4 to 7.

antioxidant (2,6-ditertiary-butyl-phenol) 20 mass ppm
antistatic (STADIS 450) 2.0 mg/l
(General Properties of Raw Oil, Aviation Fuel Oil Base and Aviation Fuel Oil)

The general properties of raw oil, aviation fuel oil base and aviation fuel oil shown in Table 2, Table 3 and Table 4 refer to values obtained by measurement in accordance with the following methods.

The density at 15° C. (density @15° C.) refers to a value obtained by measurement in accordance with JIS K2249 "Crude Oil and Petroleum Products—Determination of density and petroleum measurement tables based on reference temperature (15° C.)."

The kinematic viscosity at 30° C. or −20° C. refers to a value obtained by measurement in accordance with, JIS K2283 "Crude petroleum and petroleum products—Determination of kinematic viscosity."

The elemental analysis of C (mass %) and H (mass %) refer to a value obtained by measurement in accordance with the method defined by ASTM D 5291 "Standard Test Methods for Instrumental Determination of Carbon, Hydrogen, and Nitrogen in Petroleum Products and Lubricants."

The oxygen content refers to a value obtained by measurement in accordance with a method such as UOP649-74 "Total Oxygen in Organic Materials by Pyrolysis-Gas Chromatographic Technique."

The sulfur content refers to a value obtained by measurement in accordance with JIS K2541 "Crude Oil and Petroleum Products—Determination of sulfur content."

The mercaptan sulfur content refers to a value obtained by measurement in accordance with JIS K2276 "Determination of mercaptan sulfur in light and middle distillates fuels (potentiometric method)."

The acid value refers to a value obtained by measurement in accordance with a method of JIS K 2501 "Petroleum products and lubricants—Determination of neutralization number."

The composition ratio of fatty acid group in oils and fats refers to a value obtained in accordance with the aforementioned standard oil and fat analytical test method (defined by the Japan Oil Chemists' Society)(1993) "2.4.21.3-77 fatty acid composition (FID programmed-temperature gas chromatography)."

The flash point refers to a value obtained by measurement in accordance with JIS K2265 "Crude Oil and Petroleum Products—Determination of flash point—Tag Closed Cup Method."

The distillation properties refer to values obtained by measurement in accordance with JIS K2254 "Petroleum Products—Determination of distillation characteristics."

The aromatic content refers to a value obtained by measurement in accordance with JIS K2536 "Liquid petroleum products—Testing method of components (Fluorescent Indicator Adsorption Method)."

The total acid value refers to a value obtained by measurement in accordance with JIS K2276 "Determination of the Total Acid Value."

The freezing point refers to a value obtained by measurement in accordance with JIS K2276 "Determination of the freezing point of aviation fuels."

The smoke point refers to a value obtained by measurement in accordance with JIS K2537 "Petroleum products—Kerosine and aviation turbine fuels—Determination of smoke point."

The thermal stability refers to a value obtained by measurement in accordance with JIS K2276 "Determination of thermal oxidation stability of gas turbine fuels—JETOT method Method A, Method B."

The net heat of combustion refers to a value obtained by measurement in accordance with JIS K2279 "Crude Oil and petroleum products—Determination of heat of combustion."

The copper strip corrosion (50° C., 4 hr) refers to a value obtained by measurement in accordance with JIS K2513 "Petroleum Products—Corrosiveness to copper-Copper strip test."

The conductivity refers to a value obtained by measurement in accordance with JIS K 2276 "petroleum product—aviation fuel oil test method—conductivity test method."

The existent gum content refers to a value obtained by measurement in accordance with JIS K2261 "Motor gasoline and aviation fuels—Determination of existent gum."

The water solubility refers to a value obtained by measurement in accordance with JIS K2276 "Determination of the water reaction of aviation fuels."

The isoparaffin content (the content of isoparaffin) refers to a value measured by a gas chromatograph/time-of-flight mass spectrometer.

The content of isoparaffin having two or more branches refers to a value measured by a gas chromatograph/time-of-flight mass spectrometer.

The fraction yield at 140 to 300° C. refers to a mass ratio of the fraction at 140 to 300° C. relative to the total amount of hydroisomerized oil, which was obtained by subjecting the oil to be treated to a hydrotreatment and hydroisomerization.

(Life Cycle Characteristics)

The life cycle characteristics (life cycle $CO_2$ calculation) described in Examples herein were obtained by calculation in accordance with the following method.

The life cycle $CO_2$ were divided into $CO_2$ generated during flight (combustion of fuel) of an airplane using an aviation fuel oil and $CO_2$ generated during fuel production from mining of a raw material to supplying a fuel and separately calculated.

$CO_2$ generated by combustion (hereinafter referred to "Tank to Wheel $CO_2$") was converted into an emission per unit heating value using a defined value (jet fuel: 2.5 kg-$CO_2$/L) by the environment ministry and then put in use. Furthermore, $CO_2$ (hereinafter referred to as "Well to Tank $CO_2$") generated from mining to fuel supply to a fuel tank was calculated as a total of $CO_2$ emissions in a continuous flow from mining of raw material and crude oil sources, transporting, processing, distributing and supplying to a vehicle. Note that "Well to Tank $CO_2$" was calculated in consideration of the emissions of carbon dioxide shown in the following (1B) to (5B). As the data required for the calculation, actual oil factory operation data that the present inventors had were used.

(1B) Carbon dioxide emission associated with consumption of a fuel in facilities such as treatment apparatuses and boilers.

(2B) Carbon dioxide emission associated with a reforming reaction performed in hydrogen production apparatuses in treatments using hydrogen.

(3B) Carbon dioxide emission associated with catalyst regeneration through an apparatus conducting continuous catalyst regeneration such as contact cracking apparatus.

(4B) Carbon dioxide emission when an aviation fuel composition is produced or landed in Yokohama, transported from Yokohama to Sendai and supplied to a combustion apparatus at Sendai.

(5B) Carbon dioxide emission when animal and vegetable oils and fats and components derived from animal and vegetable oils and fats are output in Malaysia and the ambient area, and produced into a product in Yokohama.

Note that, when animal and vegetable oils and fats and components derived from animal and vegetable oils and fats are used, the rule that the emissions of carbon dioxide derived from these fuels may not be counted is applied, according to the Kyoto Protocol. In the calculation herein, the rule was applied to "Tank to Wheel $CO_2$" generated during combustion.

As is apparent from Table 4, the aviation fuel oil composition containing an aviation fuel oil base obtained by hydrotreating a raw material derived from an animal or vegetable oil and fat has general properties that are not inferior to those of a typical petroleum-based aviation fuel oil composition; on the other hand, it becomes a novel aviation fuel oil composition usable in place of petroleum, having excellent life cycle characteristics and contributing to prevention of global warming.

TABLE 3

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
|  |  |  | Aviation Fuel Oil Base 1 | Aviation Fuel Oil Base 2 | Aviation Fuel Oil Base 3 | Aviation Fuel Oil Base 4 | Aviation Fuel Oil Base 5 | Aviation Fuel Oil Base 6 | Aviation Fuel Oil Base 7 | Aviation Fuel Oil Base 8 |
| Hydrotreatment Step | Feedstock |  | Vegetable Oil and Fat 1 | Vegetable Oil and Fat 1 | Vegetable Oil and Fat 2 | Vegetable Oil and Fat 1 | Vegetable Oil and Fat 1 | Vegetable Oil and Fat 1 | Vegetable Oil and Fat 1 | Vegetable Oil and Fat 1 |
|  | Catalyst |  | Catalyst A | Catalyst A | Catalyst A | Catalyst A | Catalyst A | Catalyst A | Catalyst A | Catalyst A |
|  | Reaction Temperature (catalyst layer average temperature) | °C. | 300 | 300 | 300 | 300 | 300 | 300 | 300 | 300 |
|  | Hydrogen/Oil Ratio | NL/L | 500 | 500 | 500 | 500 | 500 | 500 | 500 | 500 |
|  | Hydrogen Pressure | MPa | 6 | 6 | 6 | 6 | 6 | 6 | 6 | 6 |
|  | LHSV | h$^{-1}$ | 1.0 | 1.0 | 1.0 | 1.0 | 1.0 | 1.0 | 1.0 | 1.0 |
|  | Recycled Amount | times mass | 1 | 1 | 1 | 1 | 1 | 1 | 1 | 1 |
| Hydro-isomerization Step | Catalyst |  | Catalyst B | Catalyst B | Catalyst B | Catalyst C | Catalyst B | Catalyst B | Catalyst B | Catalyst B |
|  | LHSV | h$^{-1}$ | 1.0 | 1.0 | 1.0 | 1.0 | 1.0 | 4.0 | 1.0 | 2.0 |
|  | Reaction Temperature (catalyst layer average temperature) | °C. | 320 | 340 | 320 | 320 | 320 | 320 | 380 | 340 |
|  | Hydrogen/Oil Ratio | NL/L | 500 | 500 | 500 | 500 | 500 | 500 | 500 | 500 |
|  | Hydrogen Pressure | MPa | 3 | 3 | 3 | 3 | 6 | 3 | 3 | 6 |
|  | Isoparaffin Content | mass % | 86.1 | 90.4 | 85.4 | 91.6 | 83.7 | 63.3 | 93.4 | 77.2 |
|  | Content of Isoparaffin Having Two or More Branches | mass % | 21.4 | 23.2 | 20.3 | 22.7 | 15.8 | 3.6 | 34.7 | 12.4 |
|  | Fraction Yield at 140 to 300° C. | mass % | 82.3 | 74.8 | 84.5 | 85.6 | 88.2 | 93.0 | 62.3 | 90.2 |
|  | Distillation Properties | T10 °C. | 195.5 | 156.5 | 153.0 | 155.5 | 225.5 | 242.5 | 158.0 | 232.0 |
|  |  | T50 °C. | 260.5 | 244.0 | 198.0 | 211.0 | 261.0 | 273.0 | 221.5 | 266.5 |
|  |  | T90 °C. | 278.0 | 273.5 | 276.5 | 269.0 | 291.0 | 296.5 | 271.0 | 292.0 |
|  |  | EP °C. | 298.5 | 299.0 | 297.5 | 298.0 | 299.0 | 298.5 | 299.0 | 299.5 |
| Base Characteristics | Cloud Point | °C. | −32.0 | −36.0 | <−45.0 | −45.0 | −16.0 | −3.0 | −36.0 | −12.0 |
|  | Flash Point | °C. | 99 | 91 | 85 | 83 | 125 | 127 | 88 | 124 |
|  | Aromatic Content | vol % | <0.1 | <0.1 | <0.1 | <0.1 | <0.1 | <0.1 | <0.1 | <0.1 |
|  | Olefin Content | vol % | <0.1 | <0.1 | <0.1 | <0.1 | <0.1 | <0.1 | <0.1 | <0.1 |
|  | Sulfur Content | mass ppm | <1 | <1 | <1 | <1 | <1 | <1 | <1 | <1 |
|  | Oxygen Content | mass % | <0.1 | <0.1 | <0.1 | <0.1 | <0.1 | <0.1 | <0.1 | <0.1 |
|  | Life Cycle Characteristics (Well toWheel-CO2 emissions) | g-CO2/MJ | 45.4 | 51.8 | 44.6 | 45.4 | 43.8 | 42.1 | 55.2 | 48.6 |

TABLE 4

|  |  |  | Example 4 | Example 5 | Example 6 | Example 7 | Example 8 | Comparative Example 5 | Comparative Example 6 | (Reference Example) Typical Commercially Available Aviation Fuel |
|---|---|---|---|---|---|---|---|---|---|---|
| Blend Ratio | Aviation Fuel Base 1 | vol % | 5 | — | — | — | — | — | — | — |
|  | Aviation Fuel Base 2 | vol % | — | 5 | 15 | — | — | — | — | — |
|  | Aviation Fuel Base 3 | vol % | — | — | — | 5 | — | — | — |  |
|  | Aviation Fuel Base 4 | vol % | — | — | — | — | 50 | — | — | — |
|  | Aviation Fuel Base 5 | vol % | — | — | — | — | — | 5 | — | — |
|  | Aviation Fuel Base 6 | vol % | — | — | — | — | — | — | 5 | — |
|  | Petroleum-based Aviation Fuel Oil Base | vol % | 95 | 95 | 85 | 95 | 50 | 95 | 95 | — |
| Density @15° C. |  | g/cm3 | 0.787 | 0.787 | 0.799 | 0.787 | 0.783 | 0.786 | 0.786 | 0.788 |
| Flash Point |  | ° C. | 51 | 52 | 58 | 49 | 71 | 61 | 63 | 46 |
| Distillation | T10 |  | 168.5 | 163.0 | 162.0 | 162.5 | 159.5 | 170.5 | 171.0 | 166.5 |
| Characteristics | T50 | ° C. | 193.0 | 198.5 | 201.5 | 192.0 | 197.5 | 194.5 | 194.0 | 191.5 |
|  | T90 |  | 272.0 | 263.5 | 266.0 | 252.5 | 236.0 | 283.5 | 285.5 | 231.5 |
|  | EP | ° C. | 297.0 | 297.5 | 298.0 | 296.0 | 296.5 | 298.0 | 298.0 | 251.5 |
| Sulfur Content |  | mass ppm | 3 | 3 | 3 | 3 | 2 | 3 | 3 | 4 |
| Mercaptan Sulfur Content |  | mass % | <0.001 | <0.001 | <0.001 | <0.001 | <0.001 | <0.001 | <0.001 | <0.001 |
| Aromatic Content |  | vol % | 16 | 16 | 14 | 16 | 8 | 16 | 16 | 17 |
| Total Acid Value |  | mgKOH/g | 0.01 | 0.01 | 0.01 | 0.01 | 0.01 | 0.01 | 0.01 | 0.01 |
| Freezing Point |  | ° C. | −48 | −49 | −47 | −51 | −48 | −44 | −45 | −52 |
| Smoke Point |  | mm | 27 | 26 | 29 | 26 | 33 | 26 | 26 | 25 |
| Kinematic Viscosity at −20° C. |  |  | 3.83 | 3.82 | 5.12 | 3.59 | 4.50 | 4.35 | 4.42 | 3.38 |
| Net Heat of Combustion |  | MJ/kg | 43.4 | 43.4 | 43.6 | 43.4 | 44.2 | 43.4 | 43.4 | 43.4 |
| Copper Strip Corrosion (50° C., 4 hr) |  |  | 1 | 1 | 1 | 1 | 1 | 1 | 1 | 1 |
| Conductivity |  |  | 210 | 210 | 220 | 210 | 200 | 210 | 210 | 210 |
| Existent Gum Content |  | mg/100 ml | <1 | <1 | <1 | <1 | <1 | <1 | <1 | <1 |
| Water Reaction | Separated State |  | 1 | 1 | 1 | 1 | 1 | 1 | 1 | 1 |
|  | Interface Rating |  | 1b | 1b | 1b | 1b | 1b | 1b | 1b | 1b |
| Thermal Oxidation Stability | Filter Differential Pressure | kPa | 0 | 0 | 0 | 0 | 0 | 0 | 0 | 0 |
|  | Tube Deposit Rating |  | <1 | <1 | <1 | <1 | <1 | <1 | <1 | <1 |
| Life Cycle Characteristics (Well toWheel-CO2 emissions) |  | g-CO2/MJ | 79.5 | 79.8 | 76.9 | 79.5 | 63.4 | 79.4 | 79.3 | 81.3 |

INDUSTRIAL APPLICABILITY

According to the present invention, there is provided an aviation fuel oil composition having excellent life cycle $CO_2$ emission characteristics and oxidation stability, which have been rarely attained by conventional aviation fuel oil compositions, as well as excellent low-temperature fluidity by containing an environment-friendly light oil base produced from an oxygen-containing hydrocarbon compound derived from an animal or vegetable oil and fat.

What is claimed is:

1. A method for manufacturing an aviation fuel oil base comprising:

hydrotreating an oil, containing an oxygen-containing hydrocarbon compound, which is derived from an animal or vegetable oil and fat and a sulfur-containing hydrocarbon compound with a catalyst prepared by supporting at least one metal selected from the elements of groups 6A and 8 of the periodic table on a support formed of a porous inorganic oxide composed of two or more elements selected from aluminum, silicon, zirconium, boron, titanium, and magnesium, under conditions of a hydrogen pressure of 2 to 13 MPa, a liquid hourly space velocity of 0.1 to 3.0 $h^{-1}$, a hydrogen/oil ratio of 150 to 1500 NL/L, and a reaction temperature of 150 to 480° C. in the presence of hydrogen to obtain a resultant hydrotreated oil, adding a recycled oil being a part of the resultant hydrotreated oil to the oil to be hydrotreated in an amount of 0.5 to 5 times by mass relative to the oxygen-containing hydrocarbon compound derived from an animal or vegetable oil and fat, and then hydroisomerizing the resultant hydrotreated oil with a catalyst prepared by supporting a metal selected from the elements of group 8 of the periodic table on a support formed of a porous inorganic oxide composed of a substance selected from aluminum, silicon, zirconium, boron, titanium, magnesium, and zeolite, under conditions of a hydrogen pressure of 1 to 5 MPa, a liquid hourly space velocity of 0.1 to 3.0 $h^{-1}$, a hydrogen/oil ratio of 250 to 1500 NL/L, and a reaction temperature of 200 to 360° C. in the presence of hydrogen.

2. The method for manufacturing an aviation fuel oil base as recited in claim 1, wherein the oil to be hydrotreated contains a petroleum-based base oil.

3. The method for manufacturing an aviation fuel oil base according to claim 1, wherein the aviation fuel oil base comprises:

a yield of a fraction having a boiling range of 140 to 300° C. of 70% by mass or more;

an isoparaffin content of 80% by mass or more;

a content of isoparaffin having 2 or more branches of 17% by mass or more;

an aromatic content of less than 0.1 vol %;

an olefin content of less than 0.1 vol %;

a sulfur content of less than 1 mass ppm; and an oxygen content of less than 0.1% by mass.

4. The method for manufacturing an aviation fuel oil base according to claim 1, wherein a sulfur content contained in the oil to be hydrotreated is 1 to 50 mass ppm in terms of a sulfur atom based on a total amount of the oil to be hydrotreated.

\* \* \* \* \*

UNITED STATES PATENT AND TRADEMARK OFFICE
CERTIFICATE OF CORRECTION

PATENT NO. : 9,505,986 B2
APPLICATION NO. : 14/331775
DATED : November 29, 2016
INVENTOR(S) : Y. Iguchi et al.

It is certified that error appears in the above-identified patent and that said Letters Patent is hereby corrected as shown below:

In the Claims

At Column 23, Line 53 (Claim 1, Line 5), "and fat" should be -- and fat, --.

Signed and Sealed this
Twentieth Day of June, 2017

Joseph Matal
*Performing the Functions and Duties of the
Under Secretary of Commerce for Intellectual Property and
Director of the United States Patent and Trademark Office*